(12) United States Patent
Kielbowicz (10) Patent No.: US 7,211,190 B2
(45) Date of Patent: May 1, 2007

(54) STRAINER WALL FOR THE SCREENING OFF OF A SUCTION SPACE

(75) Inventor: Stanislaw Kielbowicz, Waedenswil (CH)

(73) Assignee: CCI AG, Winterthur (CH)

( * ) Notice: Subject to any disclaimer, the term of this patent is extended or adjusted under 35 U.S.C. 154(b) by 86 days.

(21) Appl. No.: 10/936,840

(22) Filed: Sep. 8, 2004

(65) Prior Publication Data

US 2005/0167355 A1    Aug. 4, 2005

(30) Foreign Application Priority Data

Jan. 29, 2004   (EP)   .................. 04405055
Aug. 31, 2004   (EP)   .................. 04405543

(51) Int. Cl.
*B01D 29/21*   (2006.01)
*B01D 35/02*   (2006.01)
*G21C 15/18*   (2006.01)

(52) U.S. Cl. ................ 210/232; 210/323.1; 210/416.1; 210/459; 376/313

(58) Field of Classification Search ................ 210/232, 210/323.1, 416.1, 459, 460; 376/313
See application file for complete search history.

(56) References Cited

U.S. PATENT DOCUMENTS

| 4,049,406 A | 9/1977 | Rivers | |
| 4,225,328 A * | 9/1980 | Stiehl | 55/378 |
| 5,759,398 A * | 6/1998 | Kielbowicz | 210/416.1 |
| 5,759,399 A * | 6/1998 | Bilanin et al. | 210/416.1 |
| 5,935,439 A * | 8/1999 | Hart et al. | 210/416.1 |
| 2003/0196950 A1 | 10/2003 | Kraft | |
| 2005/0120715 A1* | 6/2005 | Labrador | 60/618 |

FOREIGN PATENT DOCUMENTS

| CH | 689687 | * 8/1999 |
| DE | 3004682 | * 8/1981 |

\* cited by examiner

*Primary Examiner*—Fred G. Prince
(74) *Attorney, Agent, or Firm*—Townsend and Townsend and Crew LLP; J. Georg Seka; Patrick J. Zhang (57) ABSTRACT

A strainer wall (1) to screen off a suction space (3) and a suction duct (5) connected to it in an emergency cooling system of a nuclear power plant includes at least one strainer wall element (2) which has an inlet side (12) and an outflow side (13), wherein the inlet side is essentially oriented perpendicular. The strainer wall element (2) is built up from a plurality of modular cassette units (11), which respectively contain a plurality of screen elements (17.1'–17.$n^m$) open towards the inlet side (12) and connected to the outflow side (13).

14 Claims, 6 Drawing Sheets

STRAINER WALL FOR THE SCREENING OFF OF A SUCTION SPACE

BACKGROUND OF THE INVENTION

The invention relates to a strainer wall for the screening off of a suction space and of a suction duct connected to it.

A reactor in a nuclear power plant is surrounded by a safety container of concrete and steel, the so-called containment. Furthermore, the reactor is equipped with an emergency cooling system (termed Emergency Core Cooling System or ECCS or Containment Spray System or CSS) in order to cool the reactor core in the event of a malfunction or incident. In such a case the water is sucked in from the lowermost part of the safety container, the so-called sump, by emergency cooling pumps via suction ducts and circulated through the reactor core.

In the design scenario for the emergency cooling system it is assumed that debris which arises in an incident falls down into the sump and/or is washed down into the sump by the downwardly flowing water. In order that this debris does not impair the ability of the emergency cooling system to operate, special screen elements, named protective screens in the following, are provided in front of the inlet openings of the suction ducts which lead to the emergency cooling pumps. These protective screens have the task of keeping back the debris resulting from the incident and simultaneously ensuring an adequate through-flow of water. In this connection it must be ensured that the pressure drop caused by the debris does not exceed the permissible limiting value.

Previously known protective screens used in nuclear power plants with pressure water reactors (PWR) are mainly formed as flat grid segments which have only a small screen surface and which can produce an impermissibly high pressure drop. Protective screen elements of corrugated and perforated sheet metal offer a larger effective screen area. However, deformations occur under pressure loading which restrict the size of such protective screen elements. A cylindrical suction screen is described in EP 0 818 227 A1 which admittedly has a very large effective screen area but can only be used in rare cases in the sump region of a PWR nuclear power plant, because the direct environment of the inlet openings of the suction ducts is constructed in such a way that it is not very suitable for the use of cylindrical suction screens. A suction space for the installation of protective screen elements with a suitable screen area is mainly provided in front of the inlet openings of the suction ducts.

SUMMARY OF THE INVENTION

An object of the present invention is to make available a protective screen the effective screen area of which is substantially larger, for example several times larger, than the area which results from the external dimensions and which can be used for the screening off of the suction space and of a suction duct connected to it in the sump region of a PWR nuclear power plant.

This object is satisfied in accordance with the invention by the strainer wall defined in the specification. The strainer wall in accordance with the invention for the screening off of the suction space and of the suction duct connected thereto in an emergency cooling system of a nuclear power plant includes at least one strainer wall element which has an inlet side and an outflow side, with the inlet side being oriented fully or partially inclined or perpendicular. The strainer wall element is built up from one or more modular cassette units, with the cassette units each containing a plurality of screen elements open towards the inlet side and connected to the outflow side. The height of the strainer wall element is preferably larger than 0.5 m and advantageously larger than 1 m.

In a preferred variant, the strainer wall includes at least two strainer wall elements whose outflow sides are oriented towards one another and open into a common outflow passage which can, for example, be formed between the strainer wall elements and/or beneath the strainer wall elements. It is also possible to provide a plurality of such strainer walls in the containment and to connect the common outflow passages to one another as required.

In a preferred embodiment, the cassette units can be placed in a row in order to assemble the strainer wall element in the desired size. The cassette units can, for example, be rectangular (or four-cornered) and/or elongate. Furthermore, the cassette units can be placed in a row in one or two directions, for example horizontally and/or vertically.

The cassette units preferably contain spaced-apart walls and/or intermediate walls, which walls and/or intermediate walls are connected to one another and/or clamped against one another, for example, by means of connection elements such as screws or pins. The walls and/or the intermediate walls of the cassette units are preferably formed as double walls and/or outflow gaps. The spacing between two walls and/or intermediate walls and/or the spacing between the two sides of a double wall is preferably determined by spacer elements.

In a further preferred embodiment, the screen elements are made as screen pockets which are surrounded by outflow gaps which are connected to the outflow side or are open towards the outflow side. The screen pockets are preferably each surrounded by outflow gaps on four sides.

In a preferred embodiment, the cassette units contain bent perforated wall segments, in particular essentially U-shaped, bent perforated wall segments between the walls and/or the intermediate walls to form the suction pockets. A plurality of U-shaped bent wall segments can, for example, be formed in an elongate, meander-shaped part. The suction pockets preferably have a depth of greater than 0.1 m, in particular greater than 0.2 m. The walls and/or the intermediate walls and/or the U-shaped bent wall segments are preferably manufactured from perforated, in particular pierced, sheet metal.

The strainer wall in accordance with the invention has the advantage that relatively large area and comparatively shallow strainer wall elements can be assembled with the cassette units. I.e. the length and width of the strainer wall elements can be selected in a wide range, while the thickness is typically significantly smaller in comparison to the length and/or width. Furthermore, it is possible to assemble a plurality of strainer wall elements into a larger strainer wall which can also have more complex shapes in accordance with the space conditions in the safety container. Arrangements are also advantageously used consisting of a plurality of strainer walls which can, for example, be provided along the walls of the containment. Thus, the strainer walls in accordance with the invention are particularly suited for the screening off of one or more suction spaces and of the suction ducts connected thereto in the sump region of a PWR nuclear power plant.

The strainer wall in accordance with the invention is also particularly suited for the retrofitting to existing plants in which a protective screen with an inadequate screen area is intended to be replaced or has to be replaced by a protective wall with a larger effective screen area under restricted space conditions and, optionally, while maintaining the original external dimensions. It is particularly advantageous that the pocket-like design of the screen surface enables a penetration flow which can flow away in five directions. The strainer wall in accordance with the invention typically has an effective screen area which is five to twenty times larger than a protective screen consisting of a planar screen surface with corresponding outer dimensions. Due to the larger effective screen area, the debris covering the screen area and the water penetration speed give rise to a substantially lower through-flow resistance, so that the pressure drop which arises across the strainer wall is correspondingly reduced.

A further advantage of the strainer wall in accordance with the invention is the pressure loadability of the strainer wall elements assembled from the cassette units. The walls and intermediate walls respectively of the cassette units and the limbs of the U-shaped bent wall segments form a grid-like network of reinforcing ribs so that the cassette units have a high degree of shape stability and can be loaded with a higher pressure than, for example, a corrugated sheet metal of corresponding size. Their great shape stability means they can simultaneously serve as protective elements to effectively block larger debris parts.

Further advantageous embodiments can be seen from the below detailed description and from the drawings.

In the following the invention will be explained in more detail with reference to embodiments and to the drawings.

BRIEF DESCRIPTION OF THE DRAWINGS

FIG. 6a illustrates a cross-section through two adjacently disposed suction pockets in accordance with a further variant.

DESCRIPTION OF THE PREFERRED EMBODIMENTS

Figure 1:
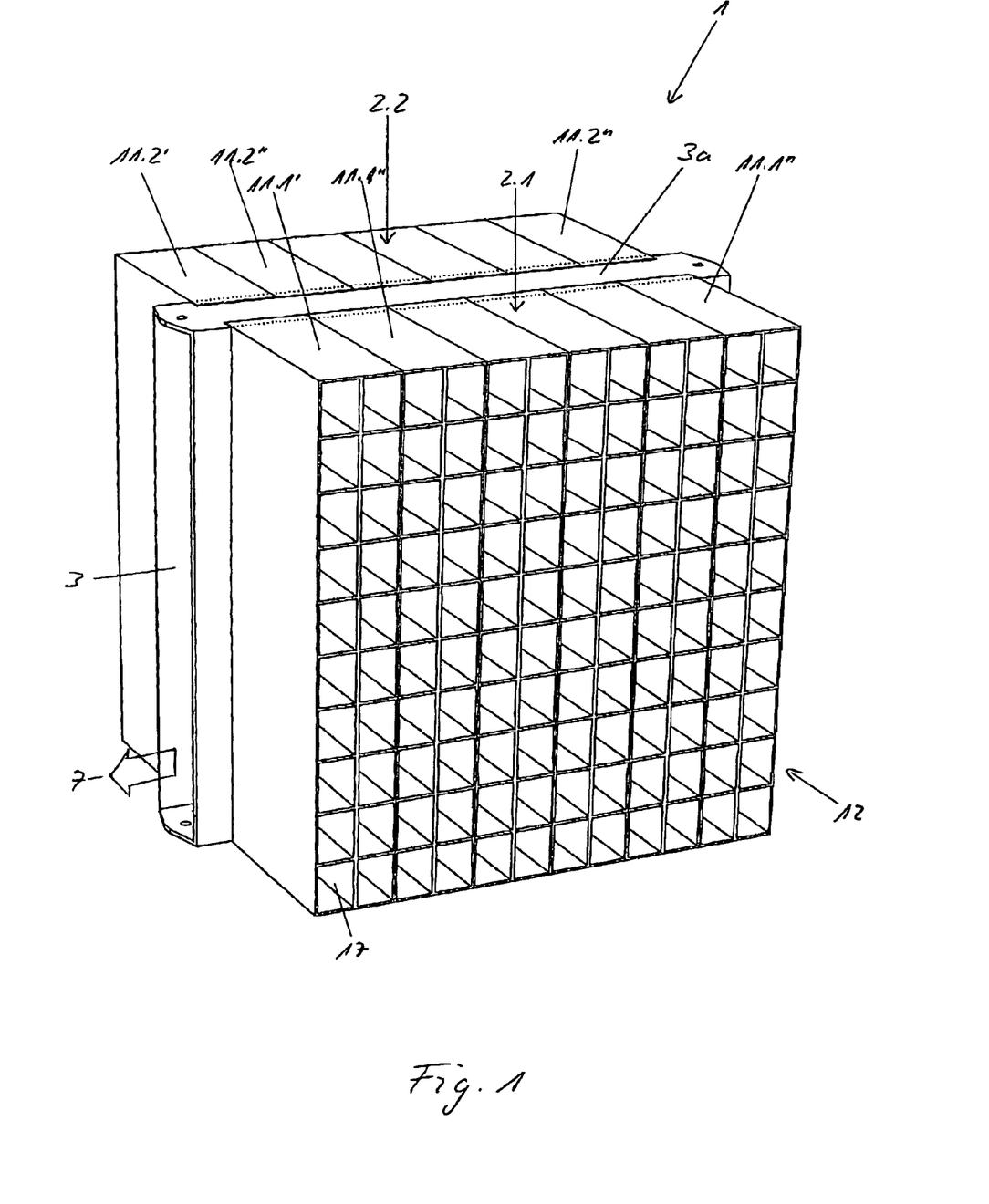
FIG. 1 illustrates an oblique view of an embodiment of a strainer wall in accordance with the present invention.

FIG. 1 shows an oblique view of an embodiment of a strainer wall in accordance with the present invention for the screening of a suction space 3 and of a suction duct connected thereto in an emergency cooling system of a nuclear power plant, in particular of a PWR power plant. The strainer walls in accordance with FIG. 1 are provided for use in the sump region of a reactor containment. The strainer wall 1 in the embodiment includes two strainer wall elements 2.1, 2.2 arranged essentially perpendicular and a common outflow passage 3a which can, for example, be arranged between the strainer wall elements. In this arrangement, the interior of the outflow passage simultaneously serves as the suction space. The outflow passage 3a shown in FIG. 1 is illustrated as open in the flow direction 7 to indicate that it can be connected optionally to the outflow passage of a further strainer wall or to one or more suction ducts. The suction ducts and pumps of the emergency cooling system are not shown in FIG. 1. The strainer wall 1 screens the suction space off with respect to the interior of the containment and prevents debris and fibrous materials such as, for example, pieces of insulation materials, which are carried along by the cooling water, from being able to enter into the suction space 3 and the suction ducts in the event of a malfunction or incident.

The strainer wall elements 2.1, 2.2 each have an inlet side 12, with the inlet side of the rear strainer wall element 2.2 being located on the rear side of the strainer wall 1 in the oblique view of FIG. 1 and thus not being visible. Furthermore, the strainer wall elements 2.1, 2.2 each have an oppositely disposed outflow side corresponding to the inlet side. The outflow sides are oriented towards one another in the embodiment and open into the common outflow passage 3a. In the oblique view of FIG. 1, the outflow sides are hidden and thus not visible. The outflow passage 3a can, for example, be formed between the strainer wall elements 2.1, 2.2 so that the outflow sides of the strainer wall elements open into the outflow passage in a large area or full area manner.

The strainer wall elements 2.1, 2.2 in the embodiment are made up of a plurality of modular cassette units 11.1'–11.1", 11.2'–11.2" which contain a plurality of screen elements 17 open to the inlet side 12 and which can advantageously be placed in a row. The screen elements 17 advantageously have at least one bend or curve to enlarge the screen area. A preferred variant of the screen elements 17 in the form of screen pockets will be described in more detail in connection with FIGS. 6a–c. The height of the strainer wall elements 2.1, 2.2 is preferably selected to be larger than 0.5 m, in particular larger than 1 m.

Figure 2:
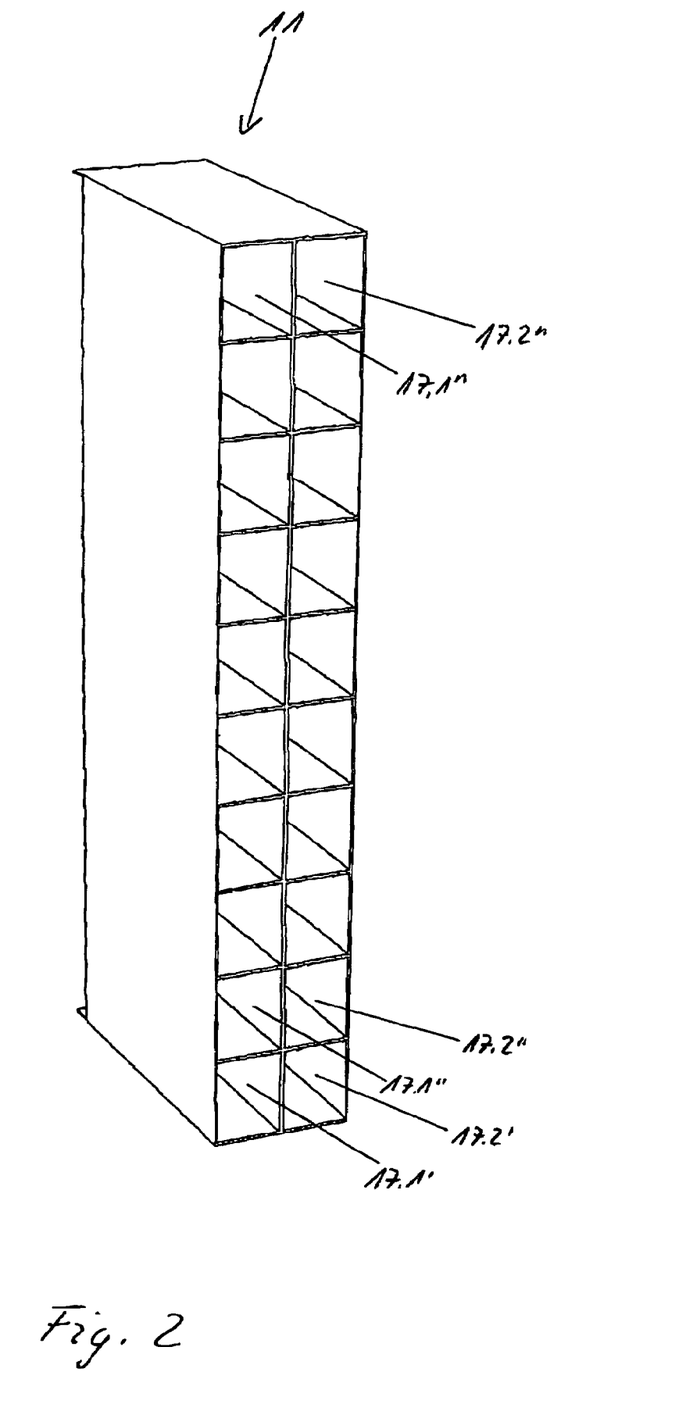
FIG. 2 illustrates an oblique view of an embodiment of a variant of a cassette unit with respect to the embodiment shown in FIG. 1.

FIG. 2 shows an oblique view of a variant of an embodiment of a cassette unit with respect to the embodiment shown in FIG. 1. The cassette unit 11 is rectangular and elongate and can optionally be placed in a row with similar cassette units in a horizontal and/or vertical direction. In the embodiment shown in FIG. 1, the cassette units extend over the whole height of the strainer wall elements 2.1, 2.2, with the cassette units being placed in a row horizontally to form a strainer wall element of a suitable width. The cassette unit 11 contains a plurality of screen elements 17.1'–17.1", 17.2'–17.2". The size and the side ratio of the inlet area of the cassette unit 11 are preferably selected so that the cassette unit can be manufactured favorably, transported simply and mounted simply. In this process, a cassette weight of typically 40 kg has proved to be favorable, since such a cassette unit can be carried and mounted in the containment by two persons without difficulty.

Figure 3:
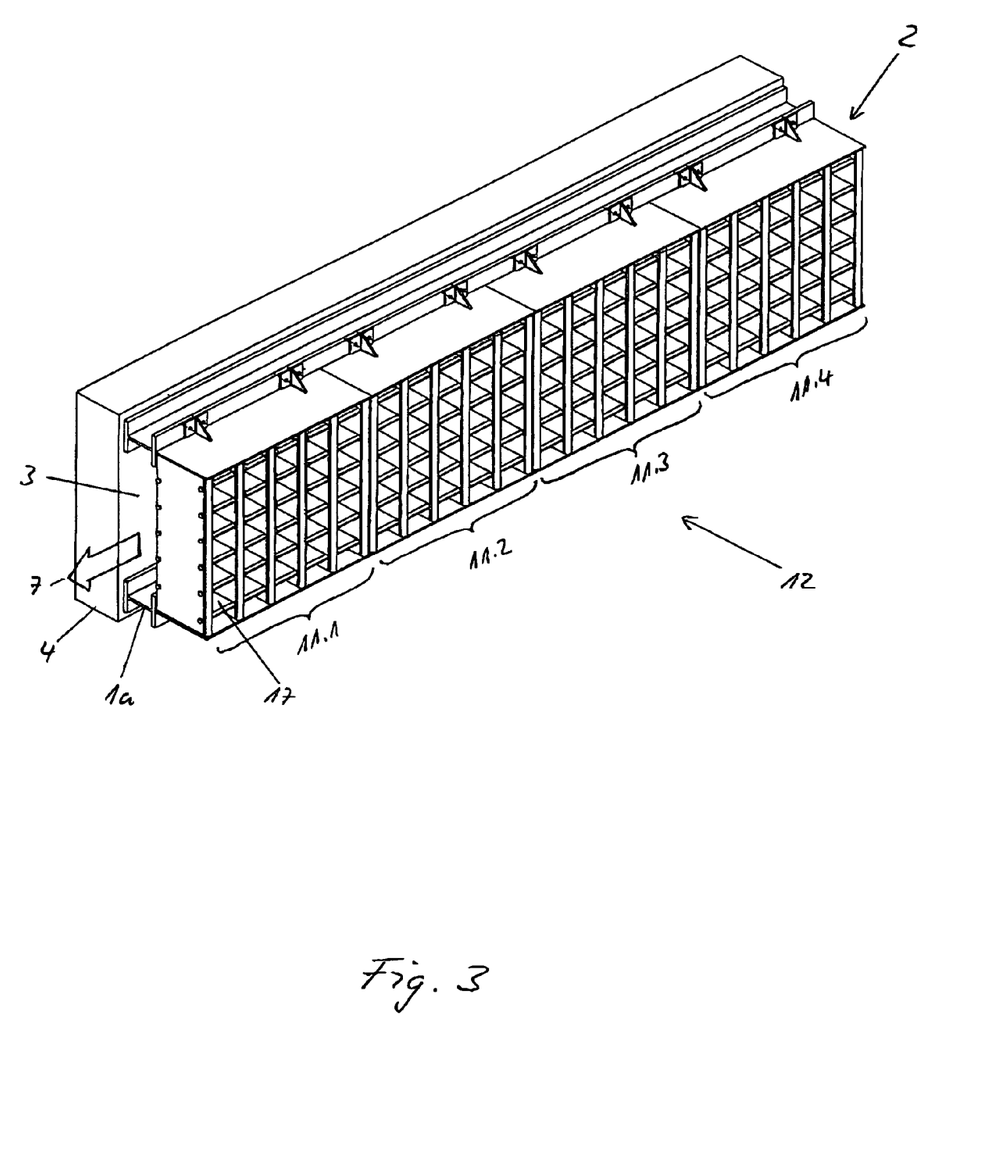
FIG. 3 illustrates an oblique view of a further embodiment of a strainer wall in accordance with the present invention.

FIG. 3 shows an oblique view of a further embodiment of a strainer wall in accordance with the present invention. The strainer wall of the second embodiment includes a strainer wall element 2 which is assembled from four modular rectangular cassette units 11.1–11.4 which are arranged sidewise in a row in one direction. The number and the arrangement of the cassette units can be varied in order to assemble strainer wall elements of the desired size. The layout of the cassette units 11.1–11.4 is explained in more detail in the following sections. The strainer wall element 2 has an inlet side 12 and an outflow side which are not visible in the present oblique view. The strainer wall element 2 adjoins a suction space 3 which is formed on one side by the strainer wall element 2 and on the opposite side by a wall element 4 which can, for example, be a second strainer wall element or a fixed plate. A concrete plate of a containment, or a different constructional part at or in the containment of a nuclear power plant, can advantageously be used as the wall element 4. In the embodiment two parallel beams and/or spacer elements 1*a* are arranged on the wall element 4 and the strainer wall element 2 is secured thereon. The beam elements or spacer elements, which can for example be executed as H-like steel sections, serve simultaneously as a lateral boundary for the suction space 3.

In FIG. 3 the suction space 3 is shown open in the flow direction 7, so that the construction of the strainer wall can be better recognized. In order to complete the construction, the suction space 3 must be closed at the side or sides still open by means of wall elements and must in addition be correspondingly lengthened if the inlet opening of the suction duct is located outside the region shown.

In a preferred embodiment a plurality of boundary surfaces of a suction space are screened off by means of strainer wall elements, with at least one inlet side or part of an inlet side of a strainer wall element being oriented inclined or perpendicular. In this manner it is, for example, possible to form a strainer wall, which is matched to the constructional environment, or a corresponding strainer wall body.

Figure 4:
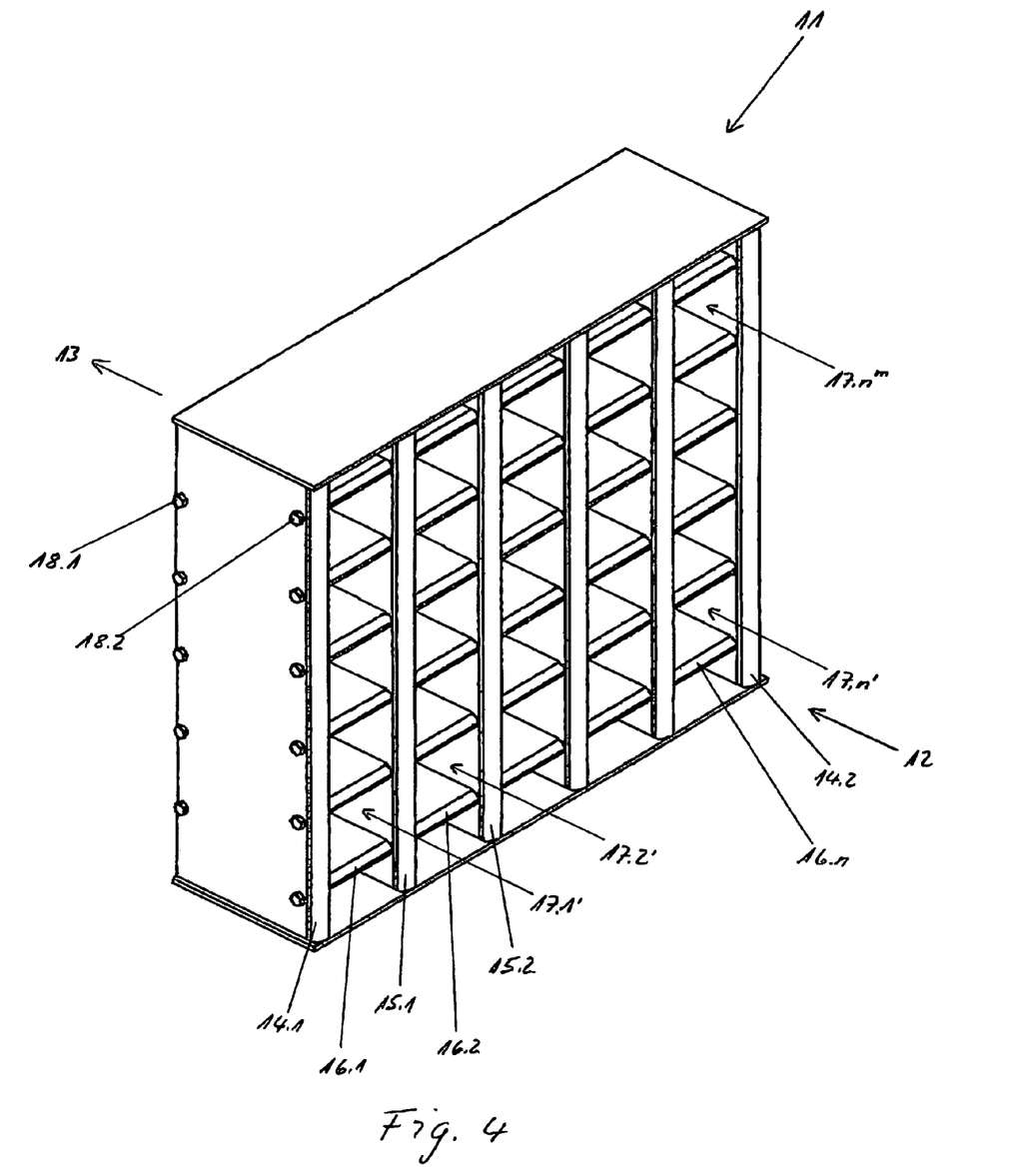
FIG. 4 illustrates an oblique view of a cassette unit of the embodiment shown in FIG. 3.

FIG. 4 shows an oblique view of a cassette unit of the embodiment shown in FIG. 3. The cassette unit 11 has an inlet side 12 and an outflow side 13 and includes outer walls 14.1, 14.2 and, depending on the requirements, one or more intermediate walls 15.1, 15.2, the outer walls and intermediate walls being arranged spaced from one another. Furthermore the cassette unit 11 includes bent and perforated wall segments 16.1–16.*n* between the outer walls 14.1, 14.2 and intermediate walls 15.1, 15.2 respectively in order to form suction pockets 17.1, 17.*n'''*. The bent wall segments can for example be U-shaped, V-shaped or similarly shaped. With advantage, wall segments 16.1–16.*n* arranged in a row are formed as elongate meandering parts. The walls 14.1, 14.2 and/or intermediate walls 15.1, 15.2 and/or the bent wall segments 16.1–16.*n* are preferably manufactured from perforated sheet metal. The diameter of the perforation holes typically lies in the range from 1 to 10 mm, preferably from 2 to 5 mm. The suction pockets 17.1–17.*n'''* preferably have a depth of greater than 0.1 m, in particular greater than 0.2 m. The walls 14.1, 14.2 and/or intermediate walls 15.1, 15.2 are connected and/or clamped against one another in the embodiment by means of connection elements 18.1, 18.2.

Figure 5:
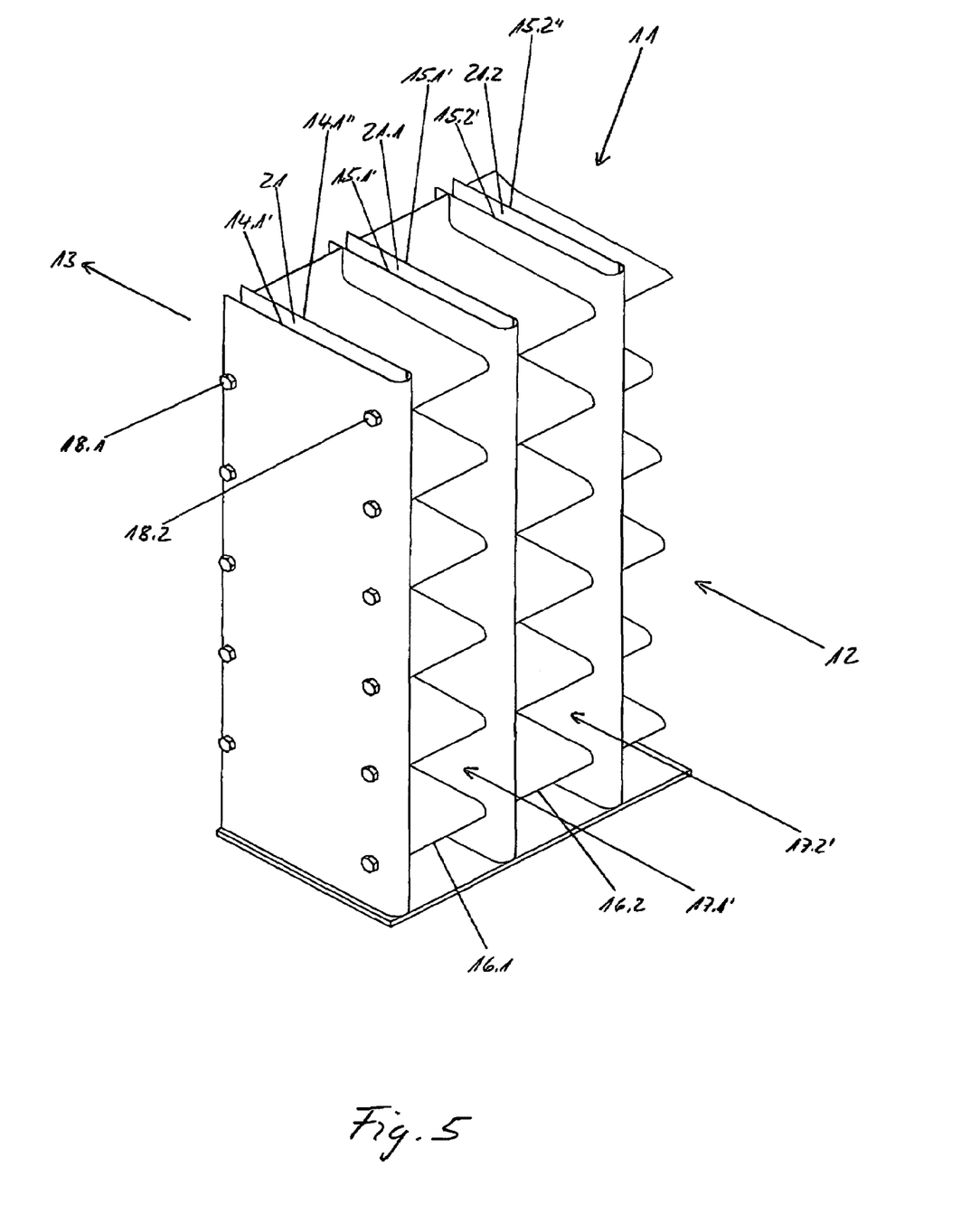
FIG. 5 illustrates an enlarged section of an embodiment of a variant of the cassette unit shown in FIG. 4.

FIG. 5 shows an enlarged section of a variant of an embodiment of the cassette unit shown in FIG. 4 in an oblique view. In this variant the walls and/or intermediate walls of the cassette units 11 are perforated and formed as double walls 14.1', 14.1", 14.2', 14.2", 15.1', 15.1", 15.2', 15.2". The double walls are preferably closed off towards the inlet side and open to the outflow side so that they form outflow gaps 21, 21.1, 21.2. Due to the double walls, the suction pockets 17.1', 17.2' are surrounded on at least two sides by the named outflow gaps 21, 21.1, 21.2 through which the water flowing out of the suction pocket into the double walls can flow away.

Figures 6A, 6C:
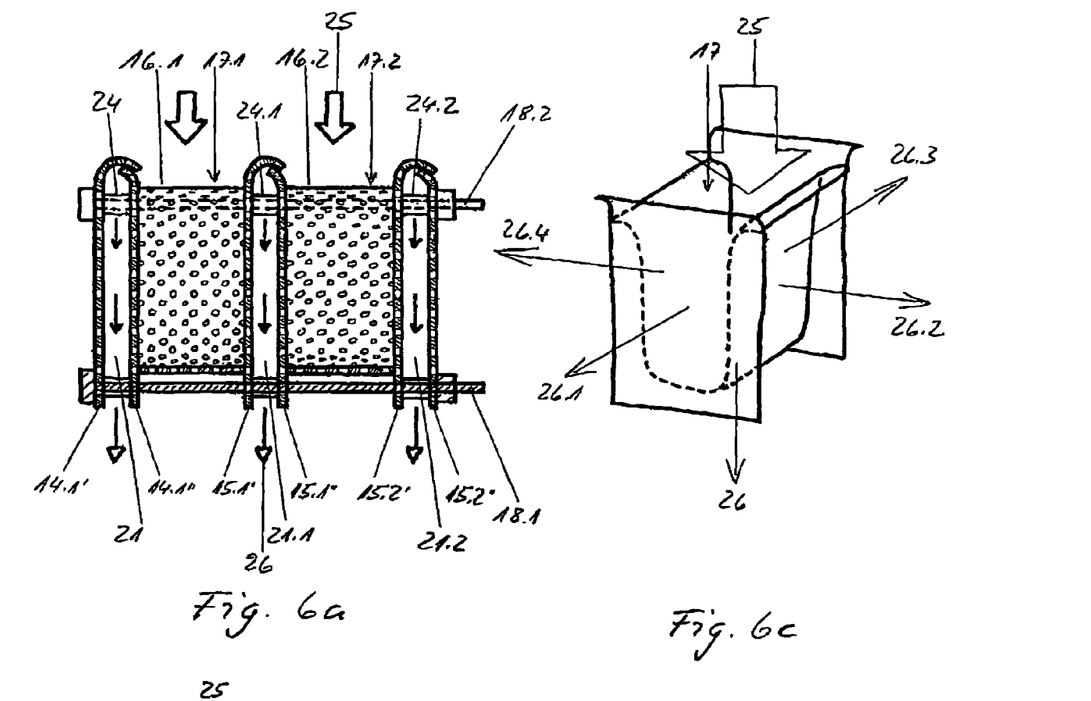

FIG. 6*a* shows a cross-section through two suction pockets lying alongside one another in accordance with a variant of the present invention. The walls and the intermediate walls are likewise executed in this variant as double walls 14.1', 14.1", 14.2', 14.2", 15.1', 15.1". The double walls are for example each formed from two, perforated, spaced-apart wall parts which are designed so that the double walls are closed off towards the inlet side whereas they are open towards the outflow side. Respective, perforated, U-shaped, bent wall segments 16.1, 16.2 are arranged between the double walls 14.1', 14.1", 14.2', 14.2", 15.1', 15.1" and form suction pockets 17.1, 17.2 together with the double walls. The double walls serve in this arrangement as lateral outflow gaps 21, 21.1, 21.2 through which lateral penetration flows can flow away out of the suction pockets. The reference numeral 25 designates the inlet side inflow direction and the reference numeral 26 the outflow direction. Further penetration flows out of the suction pockets flow through the perforated, U-shaped, bent wall segments 16.1, 16.2. The double walls 14.1', 14.1", 14.2', 14.2", 15.1', 15.1" and/or the wall parts of the same are connected by means of connection elements 18.1, 18.2, which can for example be formed as screws, threaded bolts or pins, and can be clamped against one another. The mutual spacing of the wall parts in the double walls can for example be fixed by spacer elements 24, 24.1, 24.2, while the distance between the double walls is determined by the perforated, U-shaped, bent wall segments 16.1, 16.2.

Figure 6B:
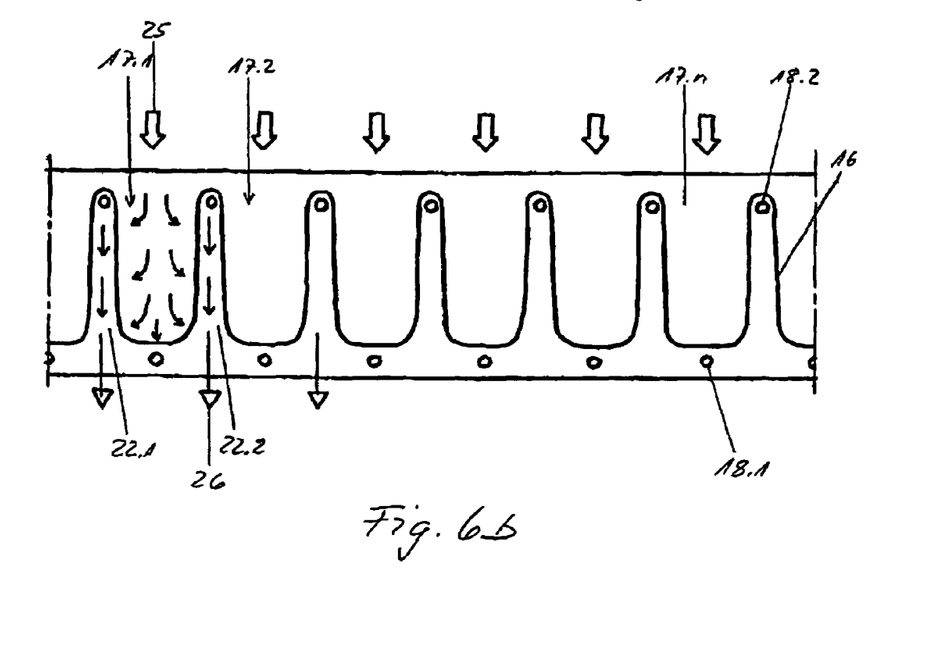
FIG. 6b illustrates a longitudinal section through a row of suction pockets in accordance with the variant shown in FIG. 6a, and FIG. 6c illustrates an oblique view of a suction pocket in accordance with the variant shown in FIGS. 6a and 6b with marking of the outflow directions of the penetration flows.

FIG. 6*b* shows a longitudinal section through a row of suction pockets in accordance with the variant shown in FIG. 5*a*. A row of perforated U-shaped bent wall segments are formed in an elongate-shaped meandering part 16. This part can be favorably manufactured by bending operations, for example from perforated sheet metal. In the meandering part 16, outflow gaps 22.1, 22.2 are formed between the U-shaped bent wall segments which are closed towards the inlet side and open towards the outflow side. The reference numeral 25 designates the inlet side inflow direction and the reference numeral 26 the outflow direction. The U-shaped bent wall segments, together with the walls or double walls, form the suction pockets 17.1–17.*n*.

The suction pockets in accordance with the variant shown in FIGS. 6*a* and 6*b* have the advantage that they are surrounded on four sides by outflow gaps 21.1, 21.2, 22.1, 22.2. In addition, the penetration flow which is sucked through the base of the suction pockets can flow away direct to the outflow side; i.e. the outflow of the penetration stream from the suction pockets takes place to all sides without disturbing resistance. FIG. 6*c* shows a perspective view of such a suction pocket 17 with a marking of the outflow directions 26, 26.1, 26.2, 26.3, 26.4 of the penetration flows.

The strainer walls in accordance with the invention are provided for use in the sump region of a reactor containment. Due to the inclined or perpendicular inlet area and to the modular construction, the strainer walls can be matched individually to the space conditions in the containment. In comparison to planar protective screens of conventional construction, the strainer walls in accordance with the present invention have a substantially larger effective screen area for the same length and width. Debris and materials which cover the screen surface thus cause a substantially lower through-flow resistance, so that the pressure drop which arises across the strainer wall of the invention is correspondingly reduced. A further advantage of the strainer walls in accordance with the invention is the comparatively high shape stability and ability to be loaded with pressure as well as the robust construction which facilitates installation work and repair work.

The invention claimed is:

1. Strainer wall for screening off a suction space and a suction duct connected to it in an emergency cooling system of a nuclear power plant, said strainer wall including at least one strainer wall element having an inlet side and an outflow side, wherein the inlet side is oriented inclined or perpendicular; the strainer wall element is built up of one or more modular cassette units; and the cassette units each contain a plurality of screen elements which are open towards the inlet side and which are connected to the outflow side, wherein the screen elements are made as suction pockets that are surrounded by outflow gaps which are connected to the outflow side or are open to the outflow side, and the cassette units contain bent wall segments between outer walls and/or one or more intermediate walls in order to form the suction pockets, wherein the bent wall segments comprise essentially U-shaped bent perforated wall segments.

2. Strainer wall in accordance with claim 1, wherein the height of the strainer wall element is greater than 1 m.

3. Strainer wall in accordance with claim 1 including at least two strainer wall elements whose outflow sides are oriented towards one another and open into a common outflow passage which is in particular formed between the strainer wall elements and/or beneath the strainer wall elements.

4. Strainer wall in accordance with claim 1, wherein the cassette units can be placed in a row in order to assemble the strainer wall element in the desired size, with the cassette units being in particular rectangular and/or elongate and in particular being able to be placed in a row horizontally and/or vertically.

5. Strainer wall in accordance with claim 1, wherein the cassette units contain spaced-apart walls and/or intermediate walls, said walls and/or intermediate walls being connected to one another by means of connection elements.

6. Strainer wall in accordance with claim 5, wherein the walls and/or the intermediate walls of the cassette units are formed as double walls and/or outflow gaps.

7. Strainer wall in accordance with claim 5, wherein the spacing between the two walls and/or intermediate walls and/or the spacing between the two sides of a double wall is determined by spacer elements.

8. Strainer wall in accordance with claim 5, wherein the walls and/or intermediate walls and/or the perforated and bent wall segments are manufactured from perforated sheet metal.

9. Strainer wall in accordance with claim 1, wherein the suction pockets are each surrounded on four sides by outflow gaps.

10. Strainer wall in accordance with claim 1, wherein the suction pockets have a depth of greater than 0.2 m.

11. Strainer wall in accordance with claim 1, wherein the cassette units contain spaced-apart walls and/or intermediate walls, said walls and/or intermediate walls being connected to one another and/or clamped against one another.

12. Strainer wall in accordance with claim 11, wherein the walls and/or intermediate walls and/or the perforated and bent wall segments are manufactured from perforated sheet metal.

13. Strainer wall in accordance with claim 1, wherein the height of the strainer wall element is greater than 0.5 m.

14. Strainer wall in accordance with claim 1, wherein the suction pockets have a depth of greater than 0.1 m.

* * * * *